United States Patent
Nakamura et al.

(10) Patent No.: US 8,237,986 B2
(45) Date of Patent: Aug. 7, 2012

(54) IMAGE READING APPARATUS, MULTIFUNCTION PRINTER APPARATUS, AND IMAGE PROCESSING METHOD

(75) Inventors: Takashi Nakamura, Yokohama (JP); Fumihiro Goto, Kawasaki (JP); Tohru Ikeda, Yokohama (JP); Akitoshi Yamada, Yokohama (JP); Hidetsugu Kagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 12/339,040

(22) Filed: Dec. 19, 2008

(65) Prior Publication Data

US 2009/0161138 A1    Jun. 25, 2009

(30) Foreign Application Priority Data

Dec. 21, 2007   (JP) ................... 2007-331067

(51) Int. Cl.
*H04N 1/60* (2006.01)

(52) U.S. Cl. ....... 358/1.9; 358/3.23; 358/3.26; 358/505; 358/518; 358/520; 358/521; 358/523; 358/529; 358/463; 358/474; 358/475

(58) Field of Classification Search .............. 358/1.9, 358/3.26–3.27, 500–518, 400–498
See application file for complete search history.

(56) References Cited

U.S. PATENT DOCUMENTS

| | | | |
|---|---|---|---|
| 5,377,025 A * | 12/1994 | Spaulding et al. | 358/518 |
| 5,539,541 A | 7/1996 | Ushida | |
| 5,687,006 A | 11/1997 | Namizuka et al. | |
| 5,689,590 A * | 11/1997 | Shirasawa et al. | 382/254 |
| 5,912,744 A | 6/1999 | Nakane | |
| 6,088,130 A * | 7/2000 | Matsukubo | 358/447 |
| 6,172,356 B1 | 1/2001 | Ogura et al. | |
| 6,233,060 B1 | 5/2001 | Shu et al. | |
| 6,290,318 B1 * | 9/2001 | Yasukawa | 347/16 |
| 6,323,957 B1 * | 11/2001 | Ball | 358/1.9 |
| 6,456,748 B1 | 9/2002 | Yushiya et al. | |
| 6,657,748 B1 | 12/2003 | Okita et al. | |
| 6,924,839 B2 | 8/2005 | Eiho et al. | |
| 6,967,605 B2 | 11/2005 | Fujihara et al. | |

(Continued)

FOREIGN PATENT DOCUMENTS

EP    1830380 A1    9/2007

(Continued)

*Primary Examiner* — Richard Zhu
(74) *Attorney, Agent, or Firm* — Canon USA Inc IP Division

(57) ABSTRACT

This invention is directed to a method capable of performing appropriate under color removal in image original reading. According to this method, under color removal of the original is performed as follows. A printing medium without any printed image is read by primary and complementary color readings. A brightness signal distribution is generated by converting, using a provisional table, each of image data generated by the reading methods. The lowest one of signal levels is selected from each of the distributions. In correspondence with each of the primary and complementary color readings, a conversion table is formed, which converts the image data to make a pixel value corresponding to the selected lowest one of the signal levels to a value representing white. Under color removal of the image data is performed using a corresponding conversion table in accordance with the reading method of the image original.

8 Claims, 16 Drawing Sheets

U.S. PATENT DOCUMENTS

| | | |
|---|---|---|
| 6,972,877 B1 | 12/2005 | Nakamura |
| 6,995,866 B2 * | 2/2006 | Feng et al. .................. 358/1.9 |
| 7,099,041 B1 * | 8/2006 | Moriya et al. ................ 358/1.9 |
| 7,119,934 B2 | 10/2006 | Yoshida et al. |
| 7,208,715 B2 | 4/2007 | Kuan |
| 7,224,494 B2 | 5/2007 | Saitou et al. |
| 7,627,189 B2 | 12/2009 | Donomae et al. |
| 2003/0161007 A1 * | 8/2003 | Maurer et al. ............... 358/3.26 |
| 2006/0077406 A1 * | 4/2006 | Bhattacharjya ............... 358/1.9 |

FOREIGN PATENT DOCUMENTS

| | | |
|---|---|---|
| JP | 2004-013339 A | 1/2004 |
| JP | 2005-184390 | 7/2005 |
| JP | 2005-295153 | 10/2005 |
| JP | 3750429 | 3/2006 |
| JP | 2006-197531 | 7/2006 |

* cited by examiner

IMAGE READING APPARATUS, MULTIFUNCTION PRINTER APPARATUS, AND IMAGE PROCESSING METHOD

BACKGROUND OF THE INVENTION

1. Field of the Invention

The present invention relates to an image reading apparatus, multifunction printer apparatus, and image processing method. Particularly, the present invention relates to an image reading apparatus, multifunction printer apparatus, and image processing method which correct density or brightness represented by image data obtained by optically reading an image original.

2. Description of the Related Art

A color scanner is known as an image reading apparatus which reads an image by switching light of different light emission wavelengths. Such a color scanner has a linear light source and an image sensor provided on a carriage movable in a predetermined direction. The light source includes LEDs capable of irradiating light emission wavelengths corresponding to three primary colors of light, that is, red (R), green (G), and blue (B). The carriage is moved in a direction (sub-scanning direction) perpendicular to the elongated direction (main scanning direction) of the linear light source. The liner image sensor receives reflected light obtained by irradiating an image original with light and reads the image original. To read the image original, a scanning read method is employed.

In the scanning read method, an original is read by switching three LEDs serving as a light source while conveying a CIS (Contact Image Sensor) unit in the sub-scanning direction. More specifically, the R component data of a color image is obtained by lighting a red LED. Next, the G component data is obtained by lighting a green LED. Finally, the B component data is obtained by lighting a blue LED. Image data of one line is obtained in one red, green, and blue LED lighting cycle. Image data of one page of the image original is obtained by repeating the lighting cycle while conveying the CIS unit in the sub-scanning direction.

In scanning read in which the red, green, and blue LEDs are sequentially turned on, color misalignment occurs. As a method of reducing color misalignment, a method of performing reading by turning on two LED light sources between charge readout timings is known, as disclosed in Japanese Patent Laid-Open No. 2005-184390.

If bright LEDs are used to improve the signal-to-noise ratio, the cost increases. To solve this problem, a method of reading an image by simultaneously turning on two LED light sources is known, as disclosed in Japanese Patent Laid-Open No. 2006-197531.

Alternatively, an image forming apparatus described in Japanese Patent No. 3750429 is known, which performs a reading operation appropriate for an original by switching illumination light in accordance with the original type such as a negative original or positive original.

FIG. 12 is a timing chart showing a primary color reading method of reading an image original by lighting only one color LED at a single timing.

As shown in FIG. 12, according to this method, the red (R), green (G), and blue (B) LEDs are sequentially turned on so that the respective color component data are output in synchronism with a pulse signal SH. When the red LED changes from ON to OFF, and the pulse signal SH is turned on, R component data is output. Similarly, when the green LED or blue LED changes from ON to OFF, and the pulse signal SH is turned on, G component data or B component data is output.

Let (R,G,B)=(255,255,255) be the brightness value of a read white original, and (R,G,B)=(0,255,255) be the brightness value of a read cyan original.

When an edge at which an original changes from white to cyan is read at the timing shown in FIG. 12, the output data of a line (a) is (R,G,B)=(255,255,255), and the output data of a line (b) is (R,G,B)=(0,255,255). In the line (a), at the light emission timing of the red LED, the original color is white. Hence, the brightness output value of the R component is 255. At the light emission timings of the green and blue LEDs, the original color is cyan. Hence, the brightness output value of the G component is 255. The brightness output value of the B component is also 255.

FIG. 13 is a timing chart showing a complementary color reading method of reading an image original by simultaneously turning on two color LEDs (simultaneously lighting two primary colors).

When an edge at which an original changes from white to cyan is read by the complementary color reading method at the timing shown in FIG. 12, the brightness output values are as follows. The output data of a line (c) is (RG,GB,BR)=(510,510,255), and the output data of a line (d) is (RG,GB,BR)=(255,510,255). The read data is converted into the brightness values of the R, G, and B color components by equation (1). In the line (c), (R,G,B)=(128,255,128). In the line (d), (R,G,B)=(0,255,255).

$$\begin{pmatrix} R \\ G \\ B \end{pmatrix} = \frac{1}{2} \begin{pmatrix} -1 & 1 & 1 \\ 1 & -1 & 1 \\ 1 & 1 & -1 \end{pmatrix} \begin{pmatrix} GB \\ BR \\ RG \end{pmatrix} \quad (1)$$

Using the obtained values of the lines (a) to (d), a CTF (Contrast Transfer Function) is calculated by equation (2). In the primary color reading method, CTF=18%. In the complementary color reading method, CTF=7%.

$$CTF = \frac{W_p - B_p}{W_p + B_p} \cdot 100 \quad (2)$$

Note that, in equation (2), $W_p$ is the maximum brightness, and $B_p$ is the minimum brightness.

As understood from a comparison between the calculated CTFs, the CTF value obtained by the complementary color reading method is smaller than that obtained by the primary color reading method. That is, if the complimentary reading method is employed, an image having a blurred edge is read. Since the reading method in the sub-scanning direction is different between the primary color reading method and the complementary color reading method, the CTF value readily changes at an edge portion in the sub-scanning direction.

The same as in image original reading by the method of simultaneously lighting two colors also applies to a two-color LED time-divisional lighting method as shown in FIG. 14.

The color of the original medium itself (to be referred to as a "background color" hereinafter) is generally perceived as a single color. At close range, however, a fine change in the color is recognizable. This can be regarded as extremely small stains generated in the process of manufacturing original printing media themselves due to various factors such as a thickness variation or density unevenness of printing media, or clusters of non-uniformly distributed pulp. In other words, a printing medium cannot have a completely uniform background characteristic. In fact, minute granular non-uniform portions exist. This structure will be referred to as a "minute stain" in the following explanation.

The minute stains exist at random all over a printing medium. When reading an original printed on such a printing medium, the background color is differently read between the primary color reading method (to be referred to as "primary color reading" hereinafter) described with reference to FIG. 12 and the complementary color reading method (to be referred to as "complementary color reading" hereinafter) described with reference to FIG. 13.

This phenomenon will be described below in more detail.

The background color should have the same signal value independently of the original reading method such as primary color reading or complementary color reading.

Primary color reading will be described first. In this case, each LED emits light during only ⅓ the unit time per pixel to be read. Data of one pixel is read only when all LEDs have emitted light.

This will be described with reference to the accompanying drawings.

FIG. 15 is a schematic view showing reading of an arbitrary pixel.

In a U region shown in FIG. 15, the red LED emits light to irradiate an original so that a first signal value R is obtained. In an M region, the green LED emits light to irradiate the original so that a second signal value G is obtained. In a B region, finally, the blue LED emits light to irradiate the original so that a third signal value B is obtained. As a result, the pixel of interest shown in FIG. 15 is represented by three, first to third signal values R, G, and B.

Assume that a "minute stain" exists in the U region in FIG. 15, as shown in FIG. 16. The stain in the U region is read by the red LED. In primary color reading, the signal value of the read U region represents the R component data of all the U, M, and B regions. In other words, the influence of the "minute stain" in the U region appears in only the R component data.

Hence, letting R' be the signal value by the red LED containing the influence of the "minute stain", and δr be the signal difference generated by the influence of the "minute stain", δr=R−R'. Similarly, when a "minute stain" is read in the M or B region, a difference δg or δb is generated for the second or third signal value. The differences δr, δg, and δb will be collectively described as δ hereinafter. Even when a background color is generally recognized as almost the same color, a variation of about δ is generated in each pixel in accordance with minute stains on the original, as is apparent from the histograms of the first to third signal values.

In complementary color reading, each LED emits light during ⅔ the reading time per pixel. That is, two LEDs read the U region in FIG. 15. A case in which a "minute stain" exists in the U region, as shown in FIG. 16, will be examined as in the case of primary color reading.

In this case, both the red LED and the green LED suffer the influence of the "minute stain". A signal value obtained by complementary color reading has a brightness range twice that of a signal value obtained by primary color reading.

To equalize the brightness ranges, the signal values obtained by the red and green LEDs must be halved. As a result, the signal difference δ generated by the influence of the "minute stain" in the read signal value appears as δ/2 in both the red and green LEDs. Similarly, when a "minute stain" is read in the M or B region, the signal difference δ/2 is generated for each of the combination of the green and blue LEDs and the combination of the blue and red LEDs.

Even when a background color is generally recognized as almost the same color, a variation of about δ/2 is generated in each pixel in accordance with minute stains on the original, as is apparent from the histograms of the first to third signal values.

As is apparent from the above examinations, in primary color reading and complementary color reading, a signal value obtained by reading a background color varies by δ−δ/2=δ/2.

This is shown in FIG. 17.

FIG. 17 shows the histograms of brightness values obtained by reading the background color of a printing medium by primary color reading and complementary color reading. Referring to FIG. 17, the abscissa represents the signal value near the background color, and the ordinate represents the appearance frequency. The solid line indicates a variation in the signal value near the background color in primary color reading. The broken line indicates a variation in the signal value near the background color in complementary color reading.

To completely remove the background color of an obtained image, the tail portions of the histograms in FIG. 17 must be removed. If the tail portions remain, discomfort isolated points are generated in the background of the read image.

If primary color reading or complementary color reading is available as the under color removal means, one of these methods cannot perform appropriately under color removal. Additionally, for the same under color removal amount, one of the methods cannot perform appropriate under color removal.

SUMMARY OF THE INVENTION

Accordingly, the present invention is conceived as a response to the above-described disadvantages of the conventional art.

For example, an image reading apparatus, multifunction printer apparatus, and image processing method according to this invention are capable of performing appropriate under color removal in image original reading.

According to one aspect of the present invention, there is provided an image processing method of processing image data obtained by causing light emitting means for emitting light components of three primary colors to irradiate an image original with the emitted light components and causing light receiving means to receive the reflected light, the method comprising: a reading step of performing primary color reading by causing the light emitting means to sequentially irradiate a printing medium without any printed image with the light components of three primary colors and causing the light receiving means to receive the light reflected by the printing medium, and performing complementary color reading by causing the light emitting means to simultaneously irradiate the printing medium with one of three different color combinations, which includes two of the light components of three primary colors, and causing the light receiving means to receive the light reflected by the printing medium; a generation step of generating a brightness signal distribution by converting, using a provisional table, each of image data generated by the primary color reading and the complementary color reading in the reading step; a selection step of selecting a lowest one of signal levels from each of the brightness signal distributions generated in the generation step; a forming step of forming conversion tables, respectively corresponding to the primary color reading and the complementary color reading, which are used for converting the image data so as to make a pixel value corresponding to the lowest one of the signal levels selected in the selection step close to a pixel value representing white; and an image processing step of performing under color removal of the image data using one of the conversion tables in accordance with a result of whether the reading of the image original is the primary color reading or the complementary color reading.

According to another aspect of the present invention, there is provided an image reading apparatus which irradiates an image original with light, receives the reflected light, and reads the image original based on the received light, the apparatus comprising: a light emitting unit configured to emit light components of three primary colors; a light receiving unit configured to receive the light reflected by the image original irradiated with the light emitting unit; a generation unit configured to generate a brightness signal distribution by converting, using a provisional table, each of image data generated by primary color reading performed by causing the light emitting unit to sequentially irradiate a printing medium without any printed image with the light components of three primary colors and causing the light receiving unit to receive the light reflected by the printing medium and complementary color reading performed by causing the light emitting unit to simultaneously irradiate the printing medium with one of three different color combinations, which includes two of the light components of three primary colors, and causing the light receiving unit to receive the light reflected by the printing medium; a selection unit configured to select a lowest one of signal levels from each of the brightness signal distributions generated by the generation unit; a forming unit configured to form conversion tables, respectively corresponding to the primary color reading and the complementary color reading, which are used for converting the image data so as to make a pixel value corresponding to the lowest one of the signal levels selected by the selection unit close to a pixel value representing white; and an image processing unit configured to perform under color removal of the image data using one of the conversion tables in accordance with a result of whether the reading of the image original is the primary color reading or the complementary color reading.

According to still another aspect of the present invention, there is provided a multifunction printer comprising: the above-described image reading apparatus; and print unit configured to print an image on a printing medium based on one of externally input image data and image data representing an image read by the image reading apparatus.

The invention is particularly advantageous since satisfactory image reading can be performed because appropriate under color removal is performed in reading an image original using a conversion table generated according to the reading method.

Further features of the present invention will become apparent from the following description of exemplary embodiments (with reference to the attached drawings).

DESCRIPTION OF THE EMBODIMENTS

Figure 1A:
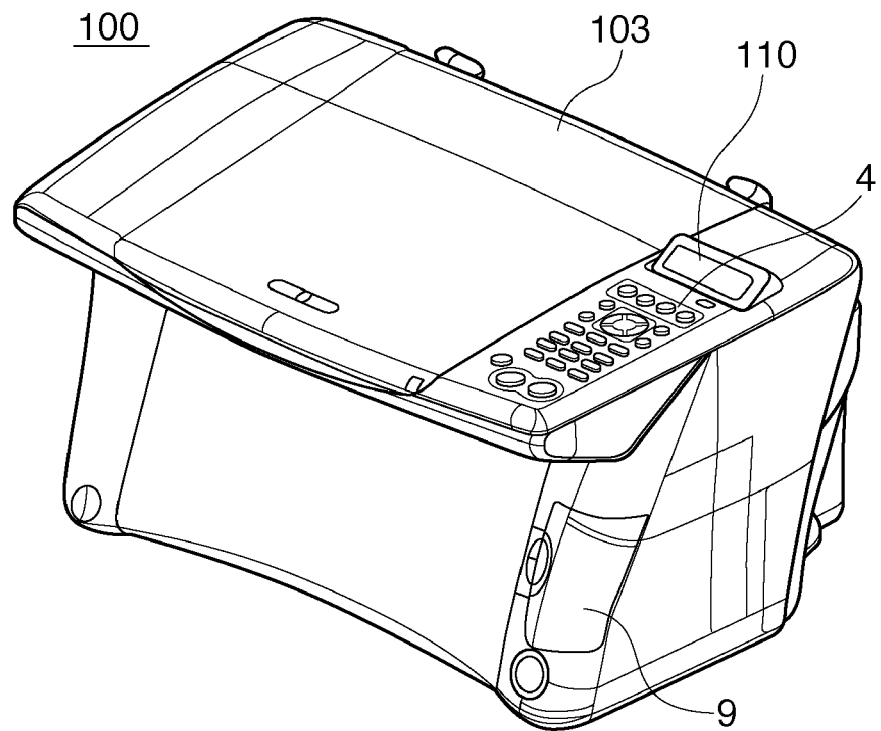
FIGS. 1A and 1B are perspective views showing the schematic arrangement of a multifunction printer (MFP) according to a typical embodiment of the present invention.

Exemplary embodiments of the present invention will now be described in detail in accordance with the accompanying drawings. The same reference numerals denote already described parts, and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Furthermore, unless otherwise stated, the term "printing element" generally means a set of a discharge orifice, a liquid channel connected to the orifice and an element to generate energy utilized for ink discharge.

The arrangement of a multifunction printer apparatus (to be referred to as an "MFP apparatus" hereinafter) to be used as a common embodiment will be described first.

<MFP Apparatus>

Figure 1B:
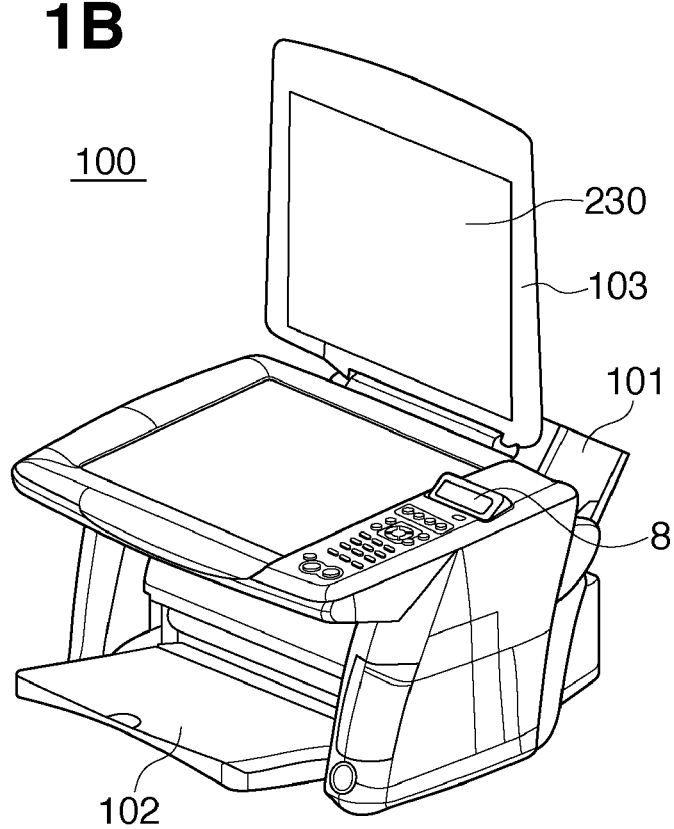

FIGS. 1A and 1B are perspective views showing the schematic arrangement of an MFP apparatus 100 according to a typical embodiment of the present invention.

The MFP apparatus can print an image on a printing medium such as a printing paper sheet based on image data from a connected host (not shown) or image data stored in a memory card, and also read and copy an image original.

FIG. 1A shows a state in which an original cover 103 is closed. FIG. 1B shows a state in which a printing medium tray 101, a discharge tray 102, and the original cover 103 are open.

A reading unit 8 including a CIS (Contact Image Sensor) unit reads an image original and outputs analog brightness signals of R, G, B components. A card interface 9 is used to receive a memory card in which image files taken by, for example, a digital still camera (not shown) are stored and read out image data from the memory card in accordance with a predetermined operation on an operation unit 4. The MFP apparatus 100 also includes a display unit such as an LCD 110. The LCD 110 is used to display contents set by the operation unit 4 or a function selection menu.

Figure 2:
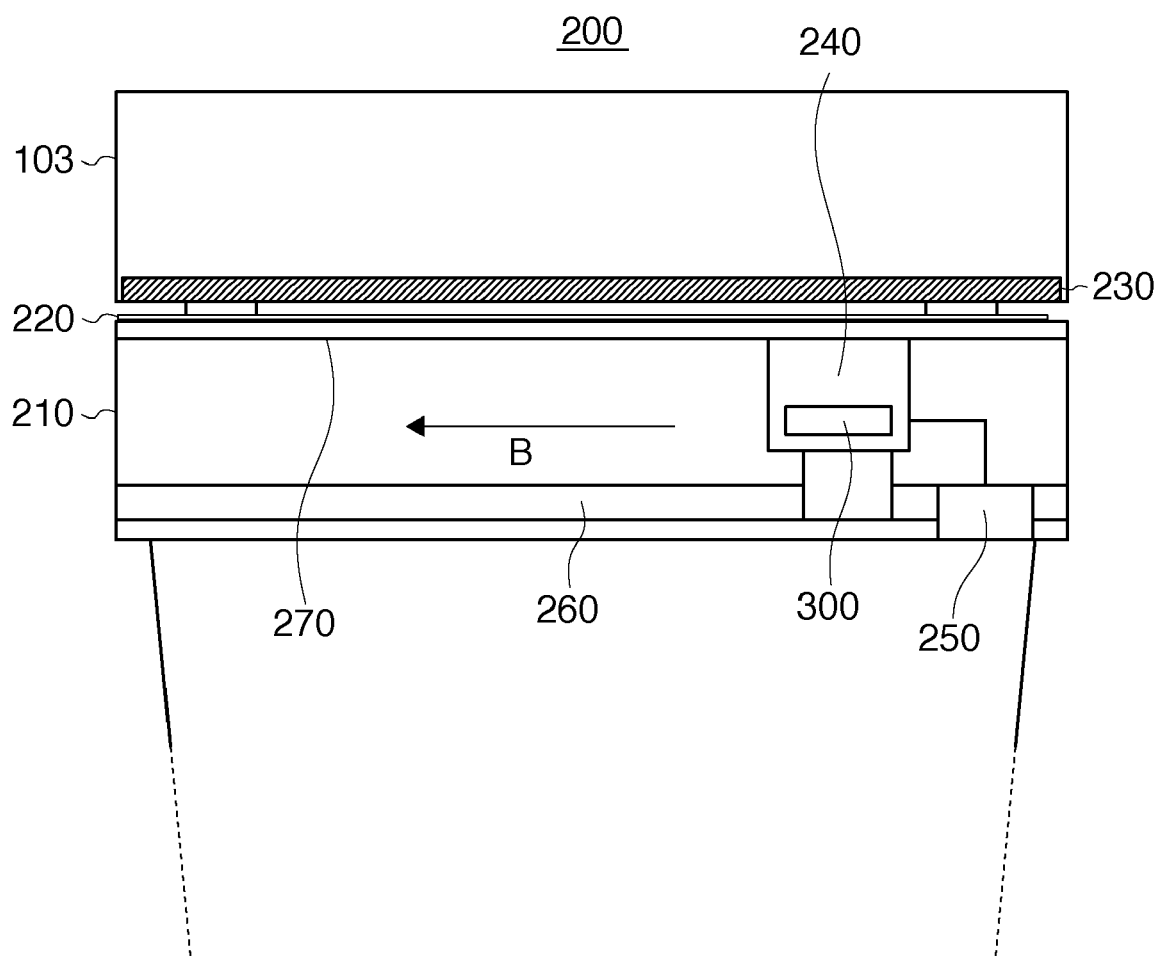
FIG. 2 is a sectional view of an image reading apparatus provided on the upper side of the MFP apparatus shown in FIGS. 1A and 1B.

FIG. 2 is a sectional view of an image reading apparatus provided on the upper side of the MFP apparatus shown in FIGS. 1A and 1B.

As shown in FIG. 2, an image reading apparatus 200 includes a main body 210, and a press plate 230 which presses an original 220 as a reading object and shields external light. The press plate 230 is set on the lower side of the original cover 103. The main body 210 includes an optical unit 240, a circuit board 250 electrically connected to the optical unit 240, a sliding rod 260 serving as a rail to scan the optical unit 240, and an original glass table 270. The optical unit 240 incorporates a CIS unit 300 which irradiates the original 220 with light, receives reflected light, and converts it into an electrical signal. In image reading, the optical unit 240 scans the original 220 placed on the original glass table 270 in the direction (sub-scanning direction) of an arrow B, thereby reading an image printed on the original 220.

Figure 3:
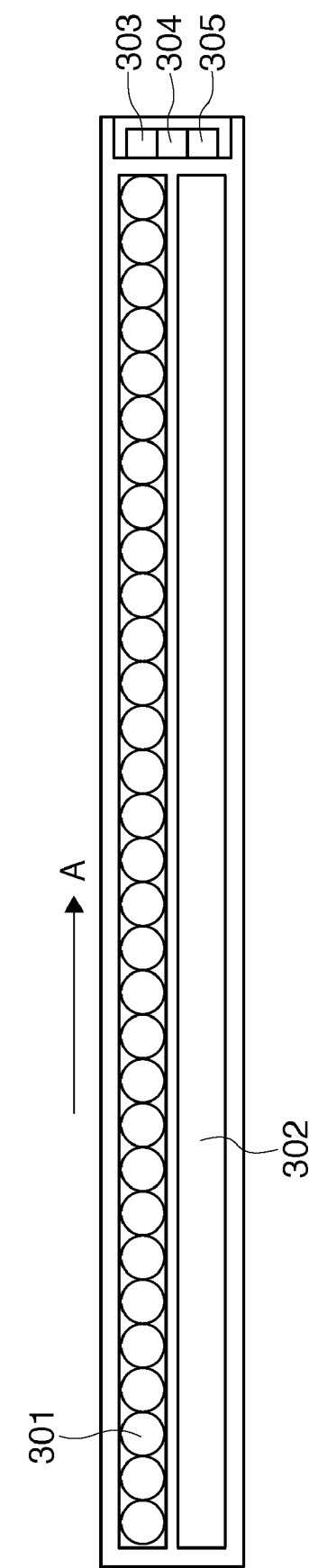
FIG. 3 is a side sectional view showing the detailed structure of a CIS (Contact Image Sensor) unit.

FIG. 3 is a side sectional view showing the detailed structure of the CIS unit 300.

As shown in FIG. 3, the CIS unit 300 includes a red LED 303 which emits red light, a green LED 304 which emits green light, and a blue LED 305 which emits blue light. In original reading, the respective color LEDs are time-divisionally turned on for each line. The original is uniformly irradiated with the emitted light via a light guide 302. A SELFOC® lens 301 condenses the reflected light for each pixel. An image of the light is formed on a photoelectric transducer (not shown) in the CIS unit so that the received light is converted into an electrical signal. An image signal of one line including R, G, and B color component signals is output in this way. The CIS unit 300 is moved in the sub-scanning direction, thereby reading the image all over the original. The direction of an arrow A which represents the cell array direction of the SELFOC® lens 301 is called a main scanning direction. The main scanning direction is perpendicular to the sub-scanning direction. In FIG. 2, the main scanning direction is perpendicular to the drawing surface.

Figure 4:
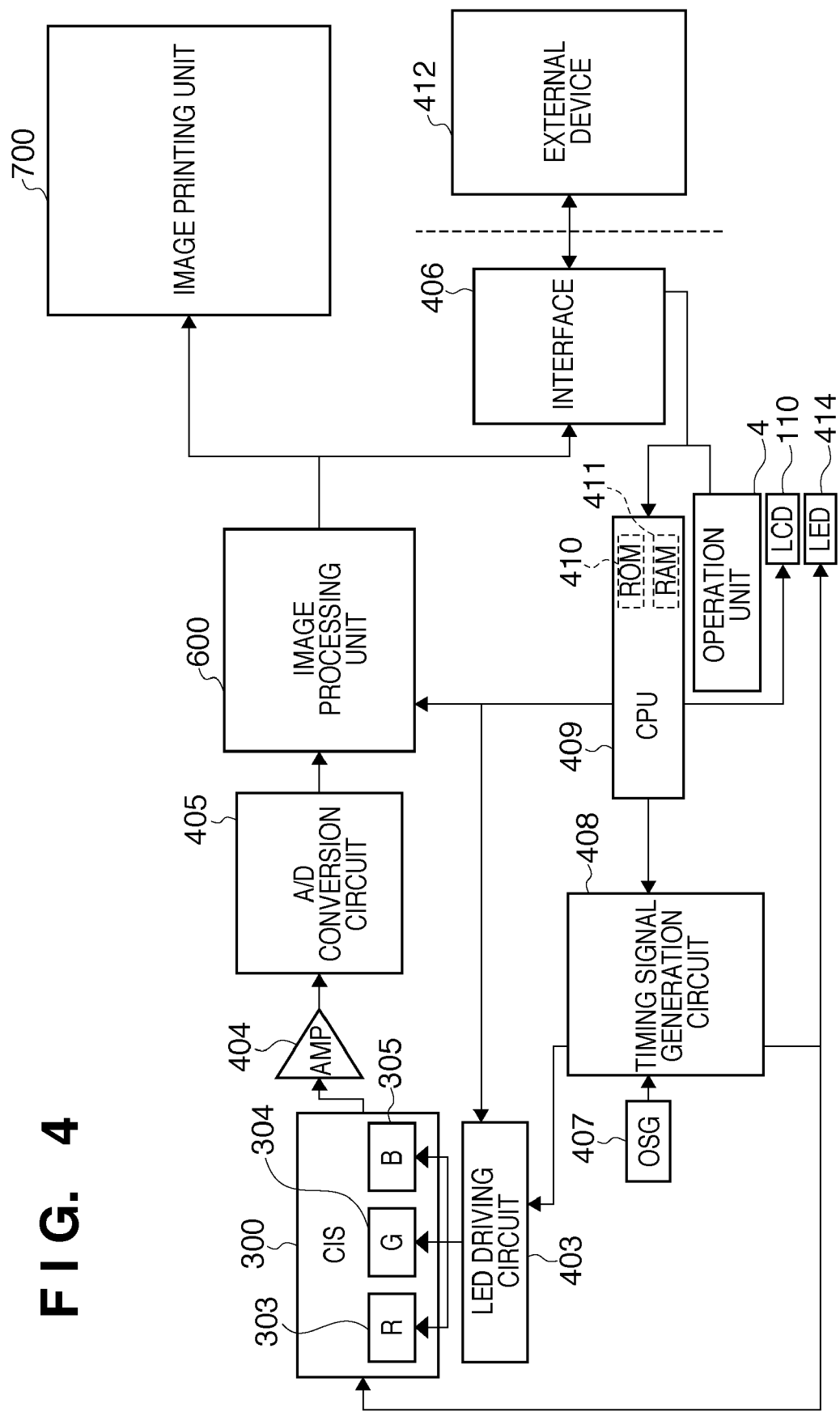
FIG. 4 is a block diagram showing the arrangement of the control circuit of the image reading apparatus.

FIG. 4 is a block diagram showing the arrangement of the control circuit of the image reading apparatus.

The same reference numerals as in FIGS. 1 to 3 denote already described constituent elements in FIG. 4, and a description thereof will not be repeated.

The CIS unit 300 line-sequentially reads a color image by causing an LED driving circuit 403 to selectively turn on the color LEDs 303 to 305 for each line. The LEDs 303 to 305 are light sources capable of changing the irradiation light amount on an original. The LED driving circuit 403 can arbitrarily turn on the LEDs 303 to 305.

More specifically, it is possible to sequentially turn on one or two of the LEDs 303 to 305 at a time or turn on all the three LEDs as needed. An amplifier (AMP) 404 amplifies the signal output from the CIS unit 300. An A/D conversion circuit 405 A/D-converts the amplified electrical signal and outputs, for example, 16-bit digital image data for each color component of each pixel. An image processing unit 600 processes the digital image data converted by the A/D conversion circuit 405. An interface control circuit (I/F) 406 reads out image data from the image processing unit 600 and transmits/receives control data to/from an external device 412 or outputs the image data. The image data from the image processing unit 600 can also be output to an image printing unit. The external device 412 is, for example, a personal computer (not shown).

An image printing unit 700 converts the image data from the interface control circuit 406 into binary data representing "print" or "not print" for each pixel and prints an image on a printing medium using printing materials. As the image printing unit 700, for example, an inkjet printer, a laser beam printer using an electrophotographic method, or a sublimation type printer is usable. These printers are known, and a detailed description thereof will be omitted.

The above-described series of processes is roughly classified into two types in accordance with the operation contents.

A copy or image reading (scanning) operation performed by the MFP apparatus alone will be described. In this case, the user of the apparatus inputs necessary instructions via the operation unit 4.

Figure 5:
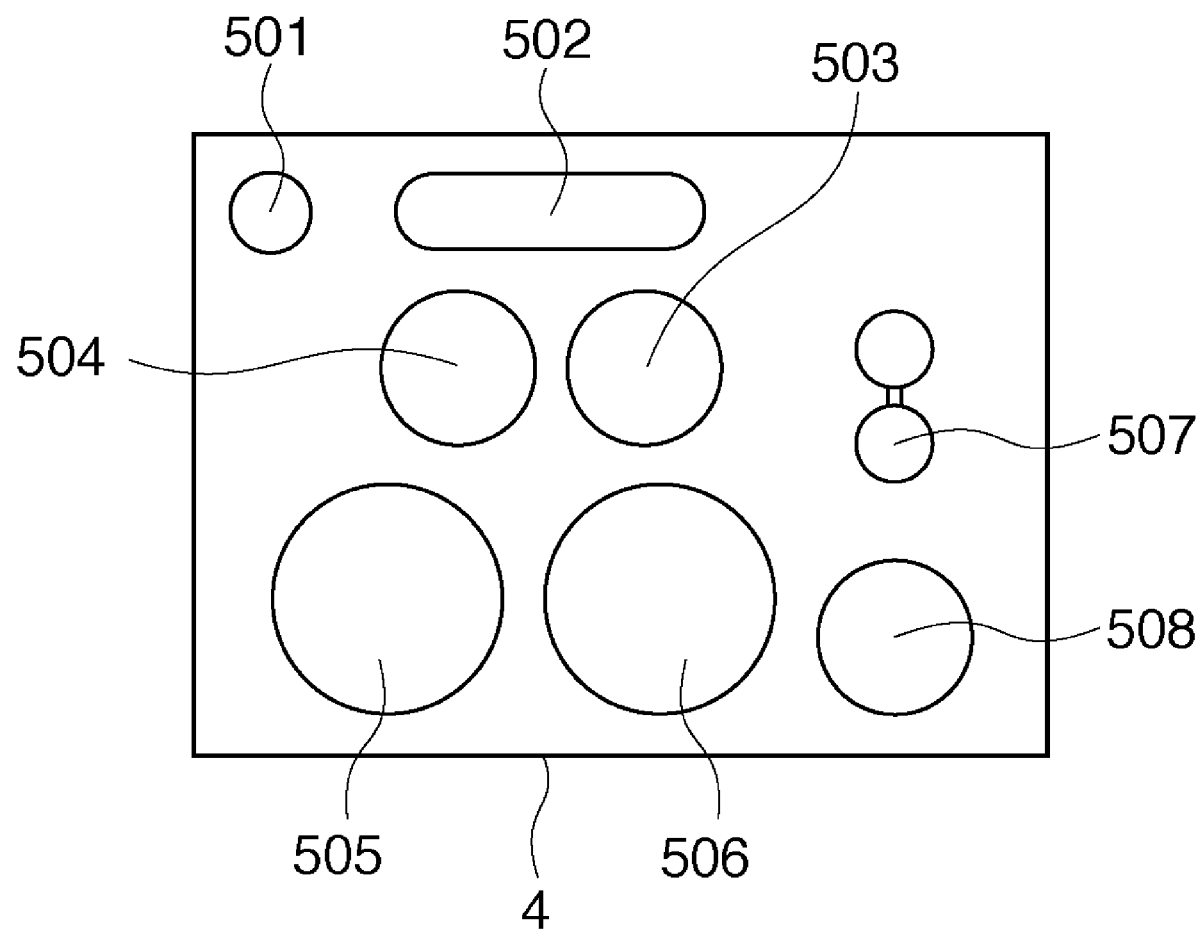
FIG. 5 is a view showing a detailed example of the arrangement of an operation unit.

FIG. 5 is a view showing a detailed example of the arrangement of the operation unit 4. The arrangement of the operation unit 4 will be described here with reference to FIG. 5.

The output signal from the operation unit 4 is connected to the input port of a CPU 409. A button 501 is a power key. A button 502 is a function selection button. Operable function contents are displayed on the LCD 110 in correspondence with the number of times of pressing the button 502. Operations are set in accordance with the displayed function contents. When the user presses a determination button 503, the contents are set in a RAM 411. A button 504 is a cancel button. When the user presses a button 505, a color copy operation starts in accordance with the settings in the RAM 411. When the user presses a button 506, a monochrome copy operation starts in accordance with the settings in the RAM 411. The user presses a button 507 to designate the number of sheets or density. A button 508 is a reset button. The user can press it to cancel scanning or printing.

The description will be continued with reference to FIG. 4.

The above-described operation instruction from the operation unit 4 is controlled by the CPU 409 in the form of a microcomputer. The CPU 409 reads out a processing program ("control program 670" in FIG. 6 to be described later) stored in a ROM 410 and executes the control using the RAM 411 as a work area. Referring to FIG. 4, reference numeral 407 denotes a reference signal oscillator (OSC) such as a quartz oscillator; and 408, a timing signal generation circuit which divides the output of the reference signal oscillator 407 in accordance with the settings of the CPU 409 to generate various kinds of timing signals as the base of operations.

For an operation based on an instruction from a personal computer (external device 412), a copy or image reading (scanning) instruction is issued from the personal computer to the CPU 409. The operation from then on is the same as in the copy or image reading (scanning) operation performed by the MFP apparatus alone.

An LED 414 serves as the backlight source of the LCD 110 and is ON/OFF-controlled by a lighting signal output from the timing signal generation circuit 408.

Details of the image processing unit 600 will be described next.

Figure 6:
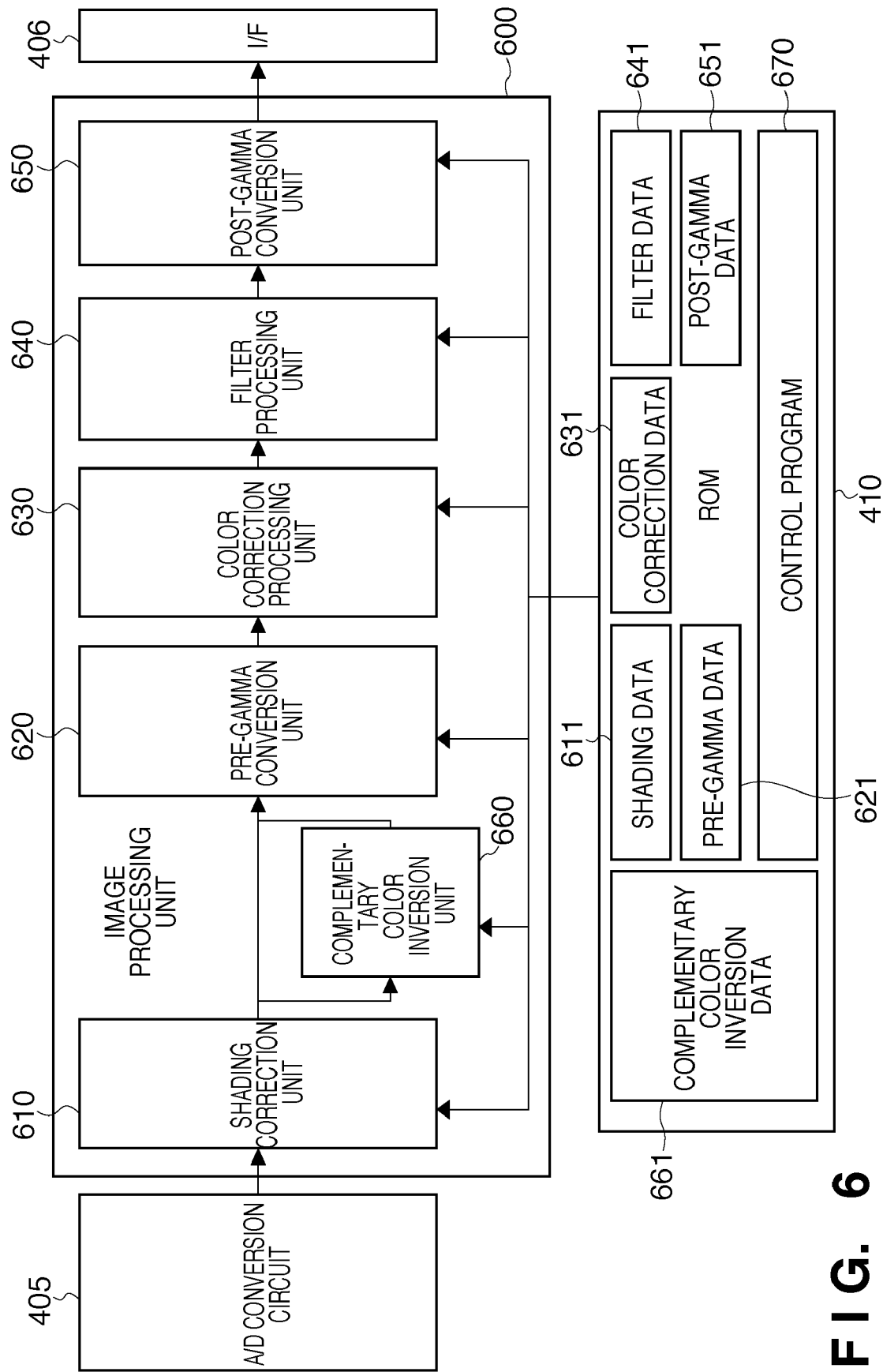
FIG. 6 is a block diagram showing the detailed arrangement of an image processing unit.

FIG. 6 is a block diagram showing the detailed arrangement of the image processing unit 600.

Digital image data converted by the A/D conversion circuit 405 is input to a shading correction unit 610. The shading correction unit 610 performs shading correction by reading a reference white board (not shown) bonded to the lower surface of an index plate (not shown) bonded to the original glass table 270 of the image reading apparatus 200.

Data used for the shading correction is shading data 611 stored in the ROM 410. The digital image data which has undergone the shading correction is input to a pre-gamma conversion unit 620. The pre-gamma conversion unit 620 performs gamma correction to obtain a visually preferable brightness distribution. Data used in the pre-gamma conversion unit 620 is pre-gamma data 621 stored in the ROM 410. The digital image data which has undergone the pre-gamma conversion is input to a color correction processing unit 630. The color correction processing unit 630 performs conversion processing to obtain preferable colors. Data used in the color correction processing unit 630 is color correction data 631 stored in the ROM 410.

The digital image data output from the color correction processing unit 630 is input to a filter processing unit 640. The filter processing unit 640 performs filter processing such as edge enhancement or noise reduction of the digital image data. Data used for the filter processing is filter data 641 stored in the ROM 410. The digital image data output from the filter processing unit 640 is input to a post-gamma conversion unit 650. The post-gamma conversion unit 650 fine-tunes the brightness characteristic of the received digital image data again in accordance with the application purpose. Data used in the post-gamma conversion unit 650 is post-gamma data 651 stored in the ROM 410. The digital image data output from the post-gamma conversion unit 650 is input to the interface control circuit (I/F) 406. Setting of these data from the ROM 410 to the respective processing units is implemented by causing the CPU 409 to read out and execute the contents of the control program 670.

A complementary color inversion unit 660 is an image processing unit which is used only when an instruction for complementary color reading is given. This processing is also controlled by the control program 670 stored in the ROM 410. Complementary color inversion data 661 stored in the ROM 410 is used for the processing. The control program also controls the operation of the LED driving circuit 403.

Embodiments of image processing executed by the MFP apparatus having the above-described arrangement will be described next in detail.

As indicated above in association with the related art, for each of color components R, G, B, signal values obtained by reading the background of an image original by primary color reading suffer variations of about ±δr, ±δg, and ±δb. On the other hand, for each of color components R, G, B, signal values obtained by reading the background of an image original by complementary color reading suffer variations of about ±δr'/2, ±δg'/2, and ±δb'/2.

In a first embodiment, an example will be described in which the variations generated by the difference in the reading method in the related art are reduced by changing the under color removal method.

How to obtain post-gamma data 651 to be set in a post-gamma conversion unit 650 will be described.

Primary color reading will be described first.

To cause the post-gamma conversion unit 650 to change the background color to white, a distribution of δ must be obtained. To do this, a parameter to enable linear response is set in the post-gamma conversion unit 650. This can be implemented by preparing a unit linear response characteristic parameter as a provisional parameter in the post-gamma data 651 to be set in a ROM 410. With the unit linear response characteristic, an input signal is directly output without any change.

More specifically, assume that the post-gamma conversion unit 650 is implemented by, for example, a one-dimensional lookup table (to be referred to as a "1D-LUT" hereinafter) having an 8-bit depth and 8-bit tone for each brightness component data.

In this case, a 1D-LUT that exhibits a unit linear response is a table in which signal levels are arranged at an equal interval corresponding to 16 levels, like Table 1. The final tone is rounded to 255.

Table 1 shows a 1D-LUT.

TABLE 1

| |
|---|
| 0 |
| 16 |
| 32 |
| 48 |
| ... |
| ... |
| 240 |
| 255 |

A reference printing medium is read using the provisional table. The reference printing medium may be changed in accordance with the application purpose. For example, paper for high-quality photo image printing, plain paper for the use in an office, or recycled paper is usable. In this example, the purpose is to obtain the signal values of the background color, and a printing medium without any printed image is preferably used as an original.

Figure 7:
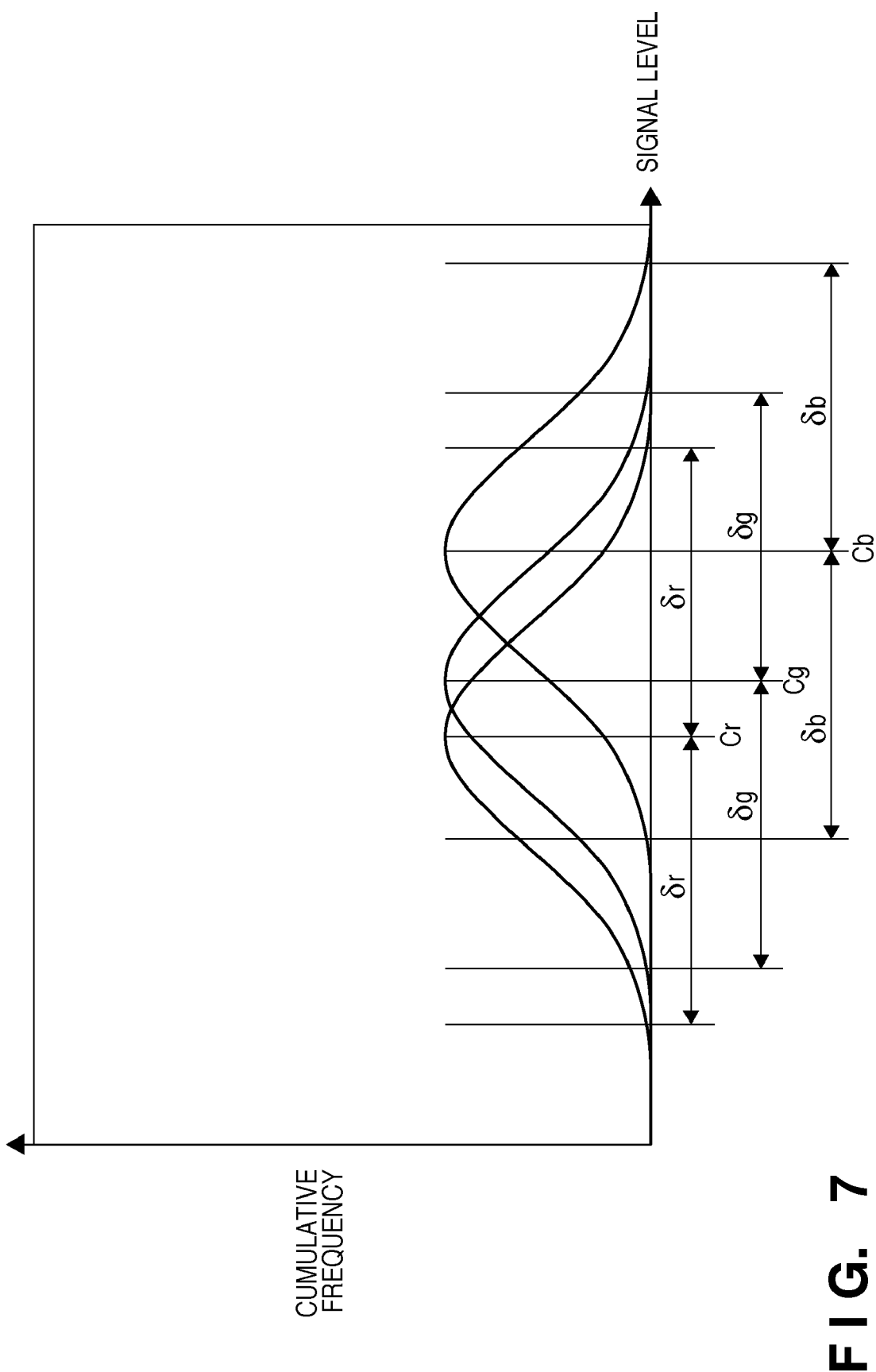
FIG. 7 is a graph showing an example of a brightness signal distribution obtained by reading a reference printing medium.

FIG. 7 is a graph showing an example of a brightness signal distribution obtained by reading a reference printing medium.

Three peaks in FIG. 7 are Cr, Cg, and Cb. To handle the background color as white, focus is placed on the lowest one of six signal level combinations Cr±δr, Cg±δg, and Cb±δb. This is because if the lowest signal level is Cr±δr, as shown in FIG. 7, and the background color is removed by removing signals except Cr, Cr−δr remains. As a result, a slightly reddish background is obtained. To prevent this, the 1D-LUT must be designed to make the background gradually bright from Cr−δr and change it to white at Cr+δr.

Figure 8:
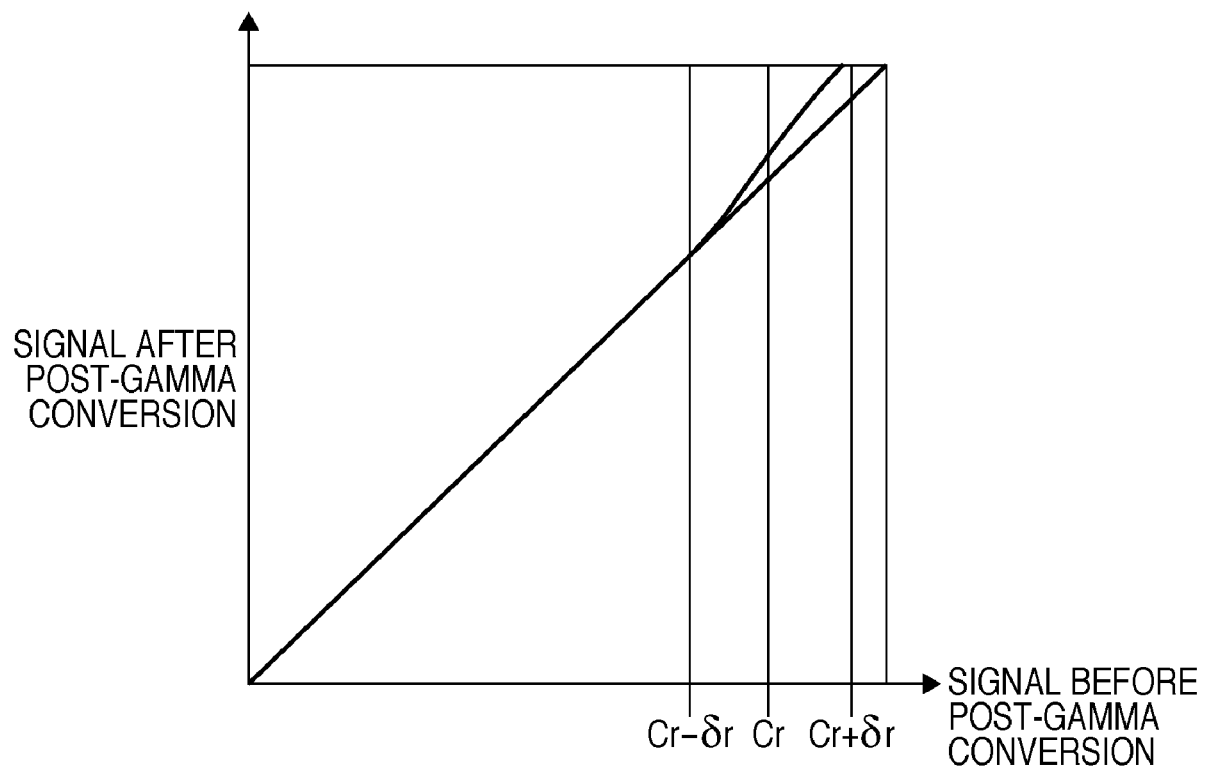
FIG. 8 is a graph showing the relationship of signals before and after post-gamma conversion processing.

With this examination, a conversion table that satisfies, for example, the relationship as shown in FIG. 8 is obtained.

FIG. 8 is a graph showing the relationship of signals before and after post-gamma conversion processing.

Referring to FIG. 8, the abscissa represents the signal value before post-gamma conversion processing, and the ordinate represents the signal value after post-gamma conversion processing. A thus defined 1D-LUT is stored in the ROM 410 as primary color post-gamma data.

Complementary color reading will be described next.

To perform complementary color reading, the user presses a button 502 to select complementary color reading.

At this time, digital image data output from an A/D conversion circuit 405 undergoes color conversion by a complementary color inversion unit 660 under the control of the control program stored in the ROM 410. To cause the post-gamma conversion unit 650 to change the background color to white, distributions of δr', δg', and δb' must be obtained.

To do this, a 1D-LUT having a linear response characteristic must be set as a provisional table, as in primary color reading. Then, a reference printing medium without any printed image is read using the table shown in Table 1, as in primary color reading.

Figure 9:
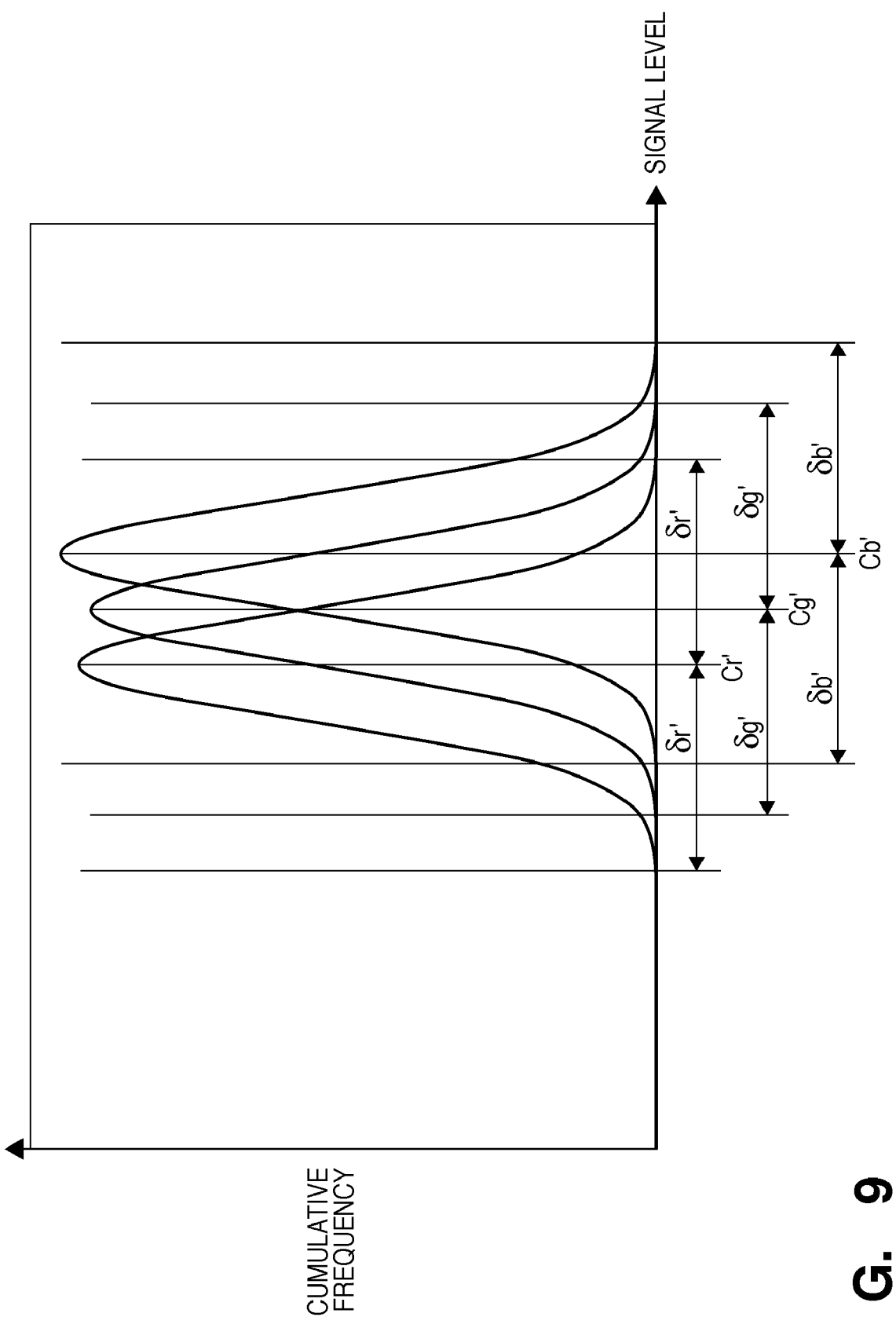
FIG. 9 is a graph showing an example of a brightness signal distribution obtained by reading a reference printing medium.

FIG. 9 is a graph showing an example of a brightness signal distribution obtained by reading a reference printing medium.

Assume that three peaks corresponding to Cr', Cg', and Cb' are obtained by reading a printing medium, as shown in FIG. 9. To handle the entire background color as white, focus is placed on the lowest one of signal level combinations Cr'±δr', Cg'±δg', and Cb'±δb'.

A 1D-LUT for complementary color reading is determined as in primary color reading.

The determined 1D-LUT for complementary color reading is stored in the ROM 410 as complementary color post-gamma data.

With the above-described processing, primary color post-gamma data and complementary color post-gamma data to be used to read an image original by the two reading methods are stored in the ROM 410 as post-gamma data.

Hence, according to the above-described embodiment, for example, the primary color post-gamma data and complementary color post-gamma data are stored in the ROM, and these data are selectively used in accordance with the image original reading method, thereby performing optimum under color removal.

In a second embodiment, an example will be described in which a processing unit except a post-gamma conversion unit 650 can perform under color removal. Only a configuration characteristic to the second embodiment will be described here. The remaining configurations are the same as in the first embodiment described above, and a description thereof will not be repeated.

A color correction processing unit 630 performs color correction for the output from a pre-gamma conversion unit 620. A three-dimensional lookup table (to be referred to as a "3D-LUT" hereinafter) is used for the color correction processing. Digital image data output from the pre-gamma conversion unit 620 undergoes color conversion using a 3D-LUT shown in Table 2.

Table 2 shows a 3D-LUT.

TABLE 2

| 0 | 0 | 0 |
|---|---|---|
| 0 | 0 | 16 |
| 0 | 0 | 32 |
| 0 | 0 | 48 |
| 255 | 255 | 255 |
| 255 | 255 | 255 |

As a color conversion method, general linear interpolation is used. More specifically, let (r,g,b) be digital image data of each pixel. Appropriate pixel data (r',g',b') is obtained by performing linear interpolation based on the values of four neighboring lattice points. This color conversion is performed using a 3D-LUT in which the values of the lattice points themselves are arranged. This method is known, and a detailed description thereof will be omitted. The 3D-LUT is generated using a method disclosed in, for example, Japanese Patent Laid-Open No. 2005-295153. The 3D-LUT is stored in a ROM 410 as color correction data 631 serving as a provisional parameter. The 3D-LUT is represented by an 8-bit depth and 8-bit tone.

First, the under color removal amount in primary color reading is determined.

To obtain the distribution of the center values Cr, Cg, and Cb on the histograms of the signal values of the background color before under color removal and the errors δr, δg, and δb, the post-gamma conversion unit 650 obtains a unit linear response characteristic. To do this, a 1D-LUT as shown in Table 1 is set from the ROM 410 to the post-gamma conversion unit 650. A brightness distribution characteristic is obtained by reading a reference printing medium.

Figure 10:
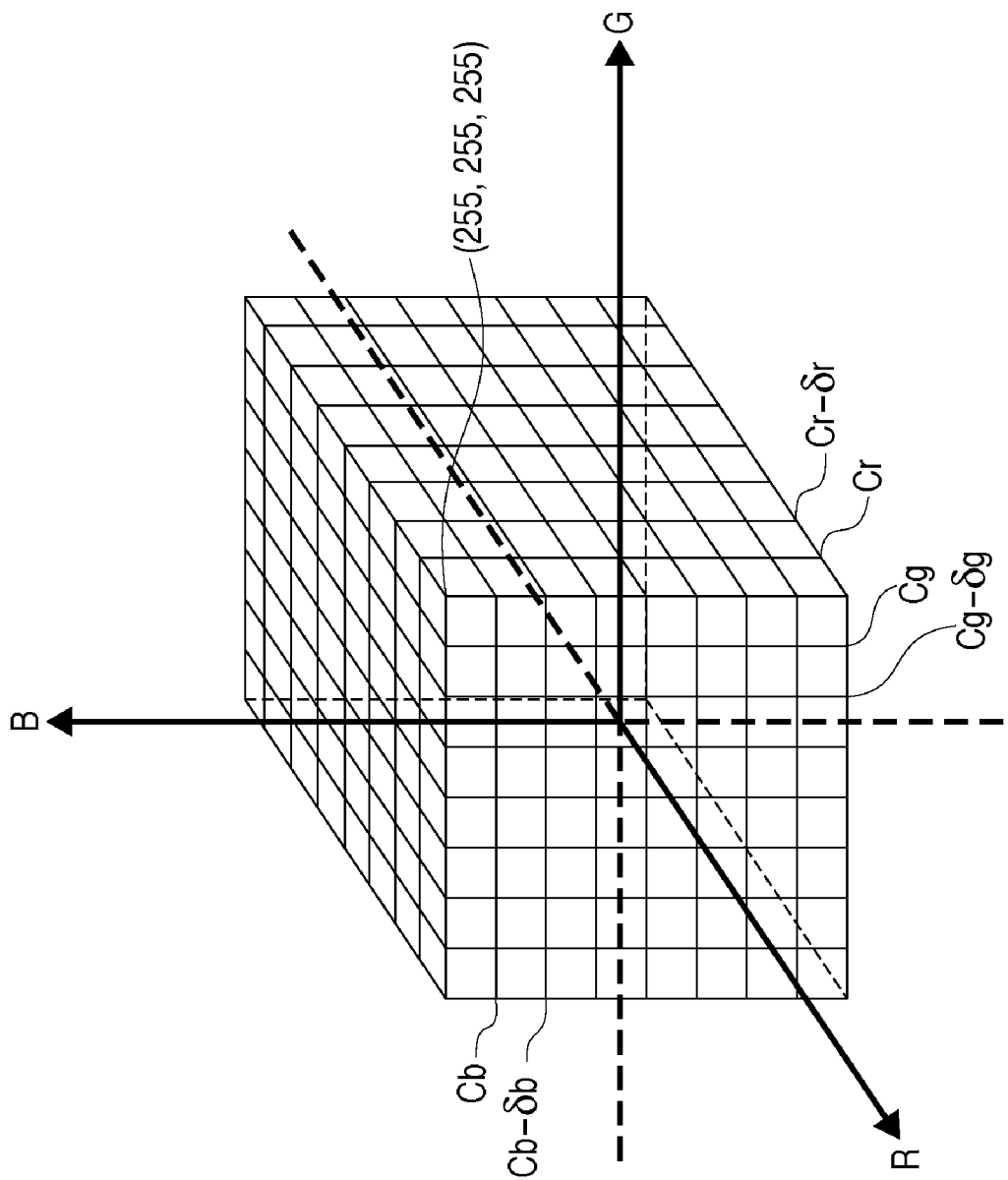
FIG. 10 is a graph showing a brightness distribution characteristic obtained by reading a reference printing medium.

FIG. 10 shows a brightness distribution characteristic obtained by reading a reference printing medium.

Consider color correction data which is a 3D-LUT having a unit linear response characteristic as a provisional parameter. As shown in FIG. 10, the color correction data can be represented by a three-dimensional cube having lattice points arranged at an equal interval.

The cube is represented by an orthogonal coordinate system having R, G, and B component values plotted along the respective axes. A diagonal line of the cube represents an achromatic component R=G=B. A point opposite to the origin (0,0,0) along the diagonal line is a white point (255,255,255). Converting a pixel of interest into white, that is, removing the background color indicates making the signal value of a lattice point near the pixel of interest used for interpolation close to white.

For example, let Rd=(Rδr,Gδr,Bδr) be the pixel value including Cr−δr. The values of neighboring lattice points surrounding Rd and the value of each lattice point which changes to white are shifted toward the white point. For Gd=(Rδg,Gδg,Bδg) and Bd=(Rδb,Gδb,Bδb) as well, the values of lattice points are shifted toward the white point. This indicates that the lattice points near the pixel of interest are shifted toward the white point.

This will be explained with reference to FIG. 11.

Figure 11:
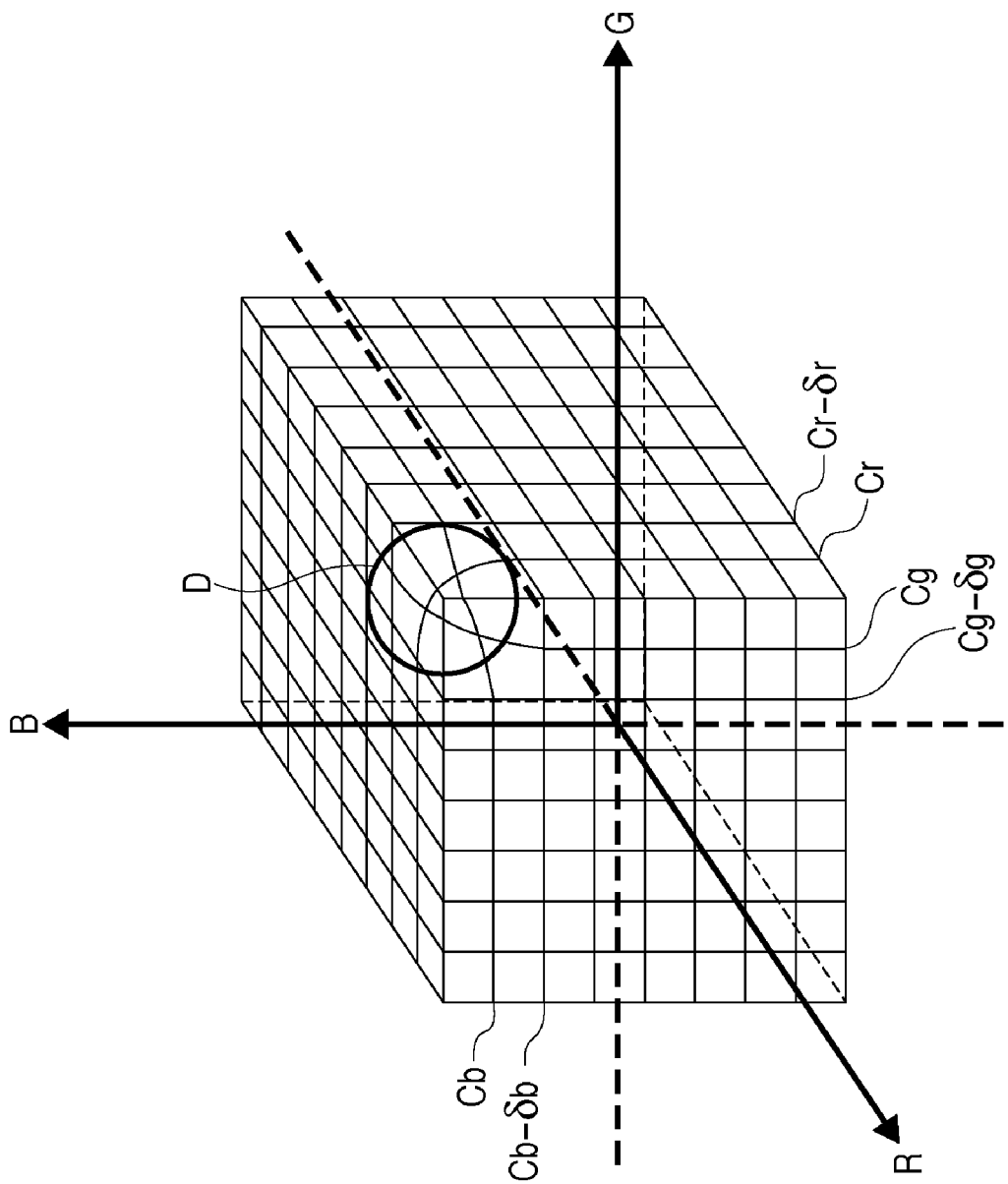
FIG. 11 is a graph showing under color removal using a three-dimensional lookup table.
Figure 12:
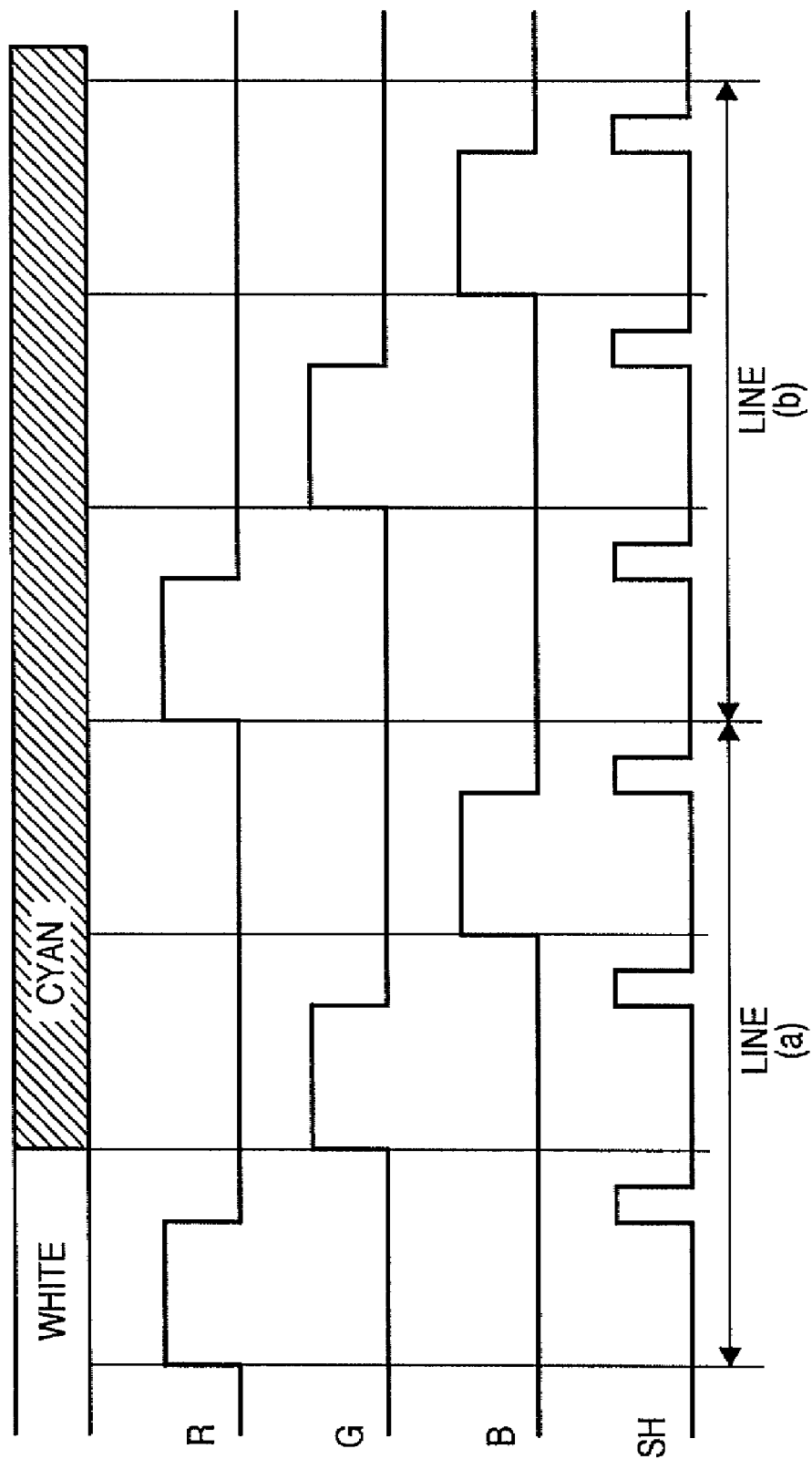
FIG. 12 is a timing chart showing a primary color reading method of reading an image original by turning on only one color LED at a single timing.
Figure 13:
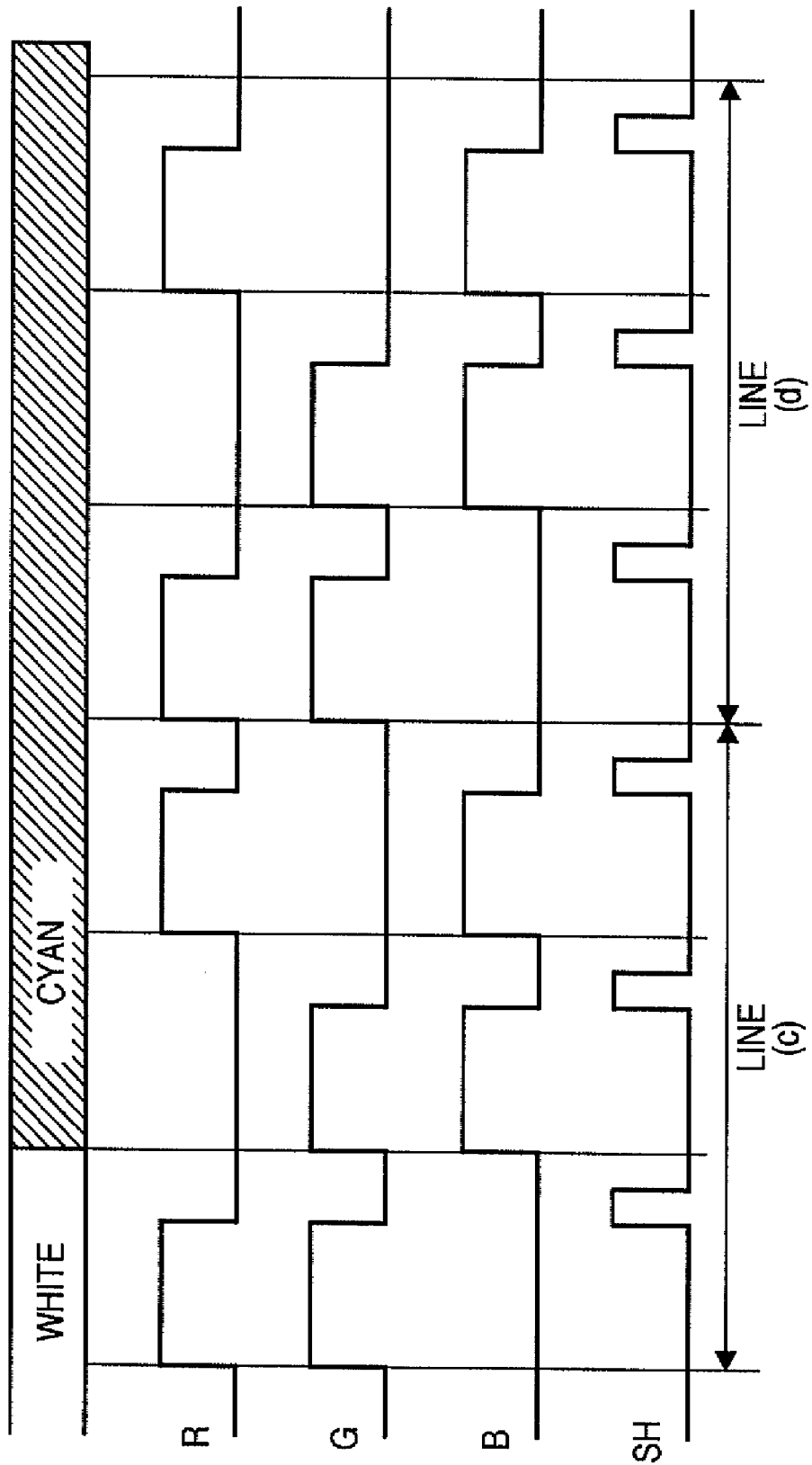
FIG. 13 is a timing chart showing a complementary color reading method of reading an image original by simultaneously turning on two color LEDs.
Figure 14:
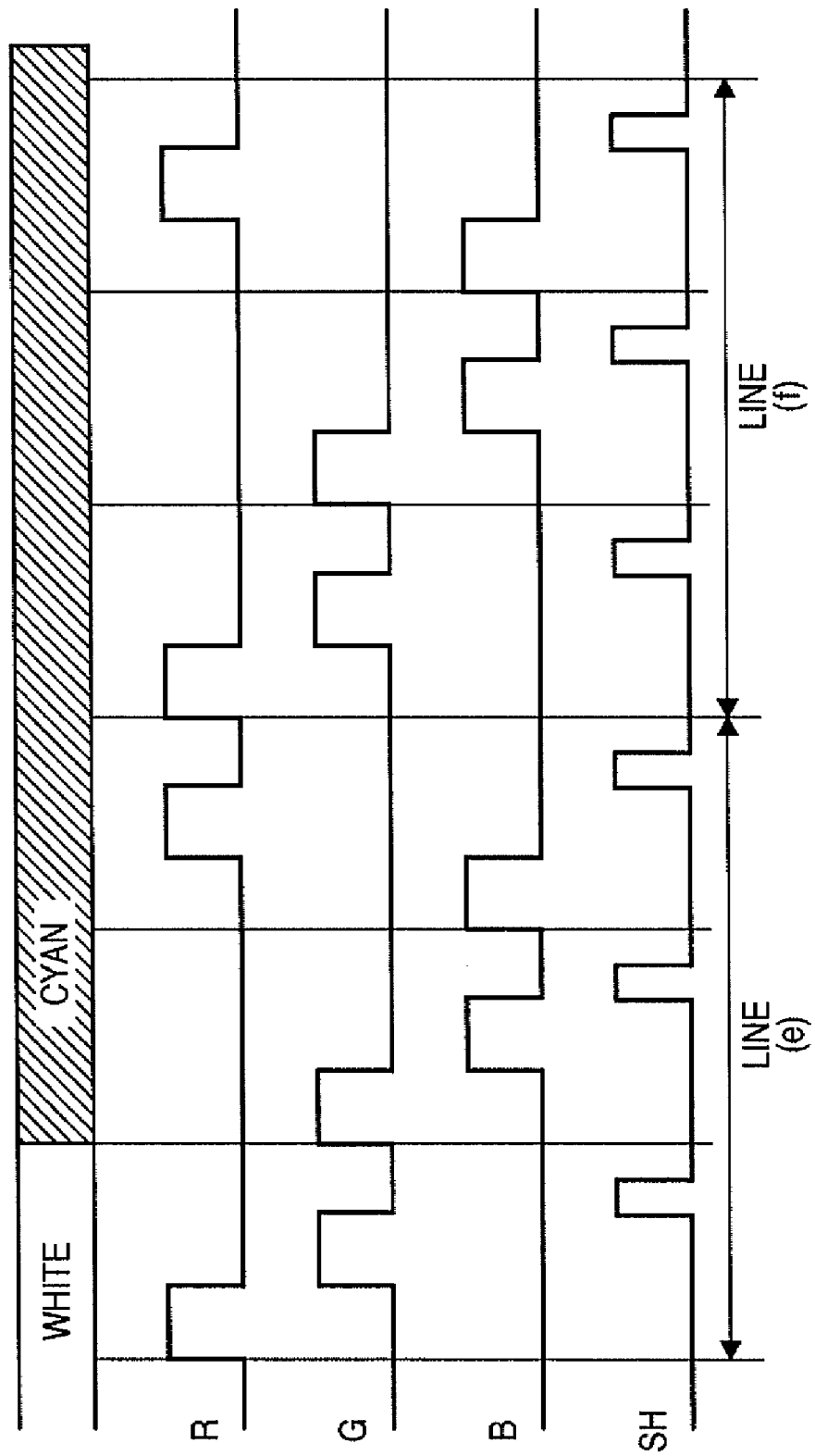
FIG. 14 is a timing chart showing a method of reading an image original using a two-color LED time-divisional lighting method.
Figure 15:
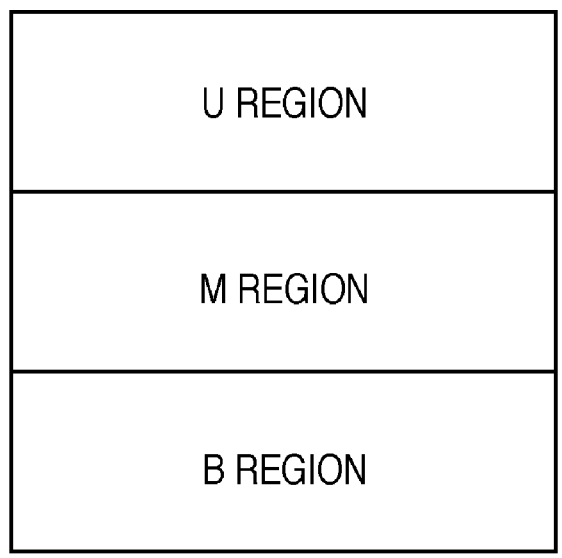
FIG. 15 is a schematic view showing reading of one pixel.
Figure 16:
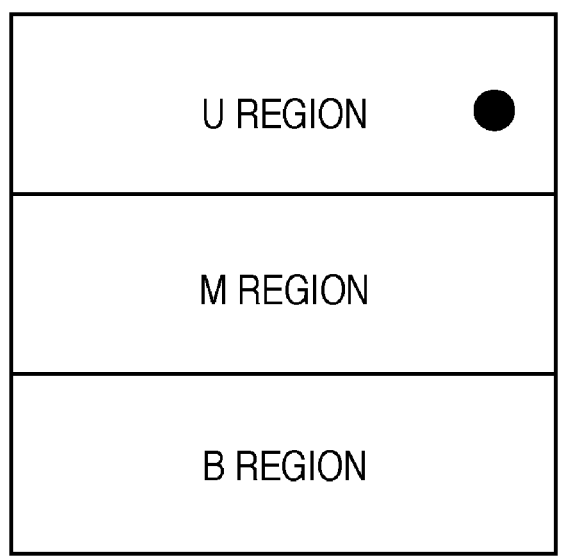
FIG. 16 is a schematic view showing reading of a pixel having a minute stain.
Figure 17:
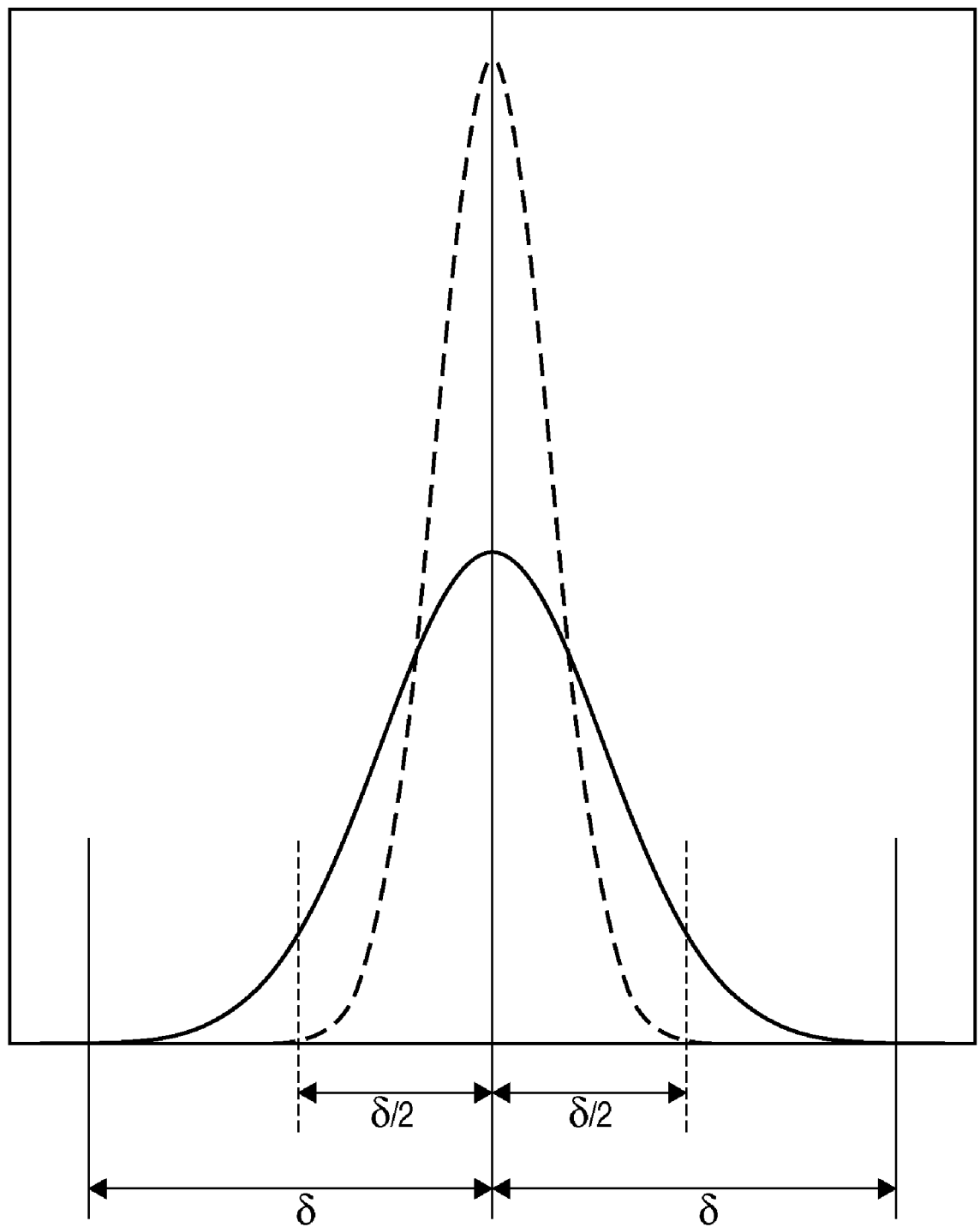
FIG. 17 is a histogram showing brightness values obtained by reading the background color of a printing medium by primary color reading and complementary color reading.

FIG. 11 shows under color removal using a 3D-LUT.

Referring to FIG. 11, the lattice points near the pixel of interest are shifted toward the white point in a region D. In the region D, the lattice points are distorted because they are not arranged at an equal interval.

The color correction data as a 3D-LUT having a unit linear response characteristic is deformed in this way to generate color correction data that is a 3D-LUT to be used for primary color reading under color removal.

The generated color correction data is composited with the color correction data 631 that is a 3D-LUT for color correction. This composition means interpolating the color correction data 631 using the generated color correction data. A thus obtained 3D-LUT allows under color removal simultaneously with color correction. The 3D-LUT is stored again in the ROM 410 as primary color reading color correction data. Hence, the 3D-LUT is the conversion table representing the relationship between the data before color correction processing and the data after color correction processing considering under color removal.

Next, the under color removal amount in complementary color reading is determined.

To obtain the distribution of the center values Cr, Cg, and Cb on the histograms of the signal values of the background color before under color removal and the errors δr, δg, and δb, the post-gamma conversion unit 650 obtains a unit linear response characteristic. To do this, a 1D-LUT as shown in Table 1 is set from the ROM 410 to the post-gamma conversion unit 650. A brightness distribution characteristic is obtained by reading a reference printing medium.

The same processing as in primary color reading is executed for a thus obtained brightness distribution characteristic, thereby obtaining a 3D-LUT which allows under color removal simultaneously with color correction. The 3D-LUT is stored again in the ROM 410 as complementary color reading color correction data.

With the above-described processing, primary color reading color correction data and complementary color reading color correction data, which allow under color removal simultaneously with color correction, are stored as the color correction data 631.

Hence, according to the above-described embodiment, the primary color reading color correction data and complementary color reading color correction data are stored in the ROM, and these data are selectively used for color correction processing in accordance with the image original reading method, thereby performing optimum under color removal.

As the ROM 410 mentioned in the first and second embodiments, an EEPROM is used to enable data rewrite. Memories may selectively be used so that data which require no rewrite are stored in an unrewritable ROM, whereas data which require rewrite are stored in an EEPROM. Except an EEPROM, a rewritable non-volatile memory such as an EPROM or FeRAM may be used.

In the above-described embodiments, it is possible to increase the printing density and resolution particularly using, of inkjet printing methods, a method of changing the ink state by heat energy generated by a means (e.g., electro-thermal transducer) for generating heat energy for ink discharge.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-331067, filed Dec. 21, 2007, which is hereby incorporated by reference herein in its entirety.

What is claimed is:

1. An image processing method of processing image data obtained by, in an image reading apparatus, causing light emitting means for emitting light components of three primary colors to irradiate an image original with the emitted light components and causing light receiving means to receive the reflected light, the method comprising:
   a reading step of, in the image reading apparatus, performing primary color reading by causing the light emitting means to sequentially irradiate a printing medium without any printed image with the light components of three primary colors and causing the light receiving means to receive the light reflected by the printing medium, and performing complementary color reading by causing the light emitting means to simultaneously irradiate the printing medium with one of three different color combinations, which includes two of the light components of three primary colors, and causing the light receiving means to receive the light reflected by the printing medium;
   a conversion step of converting image data generated by the complementary color reading into image data represented by a color space that is the same as that representing image data generated by the primary color reading;
   a generation step of generating a brightness signal distribution of each color component from each of image data generated by the primary color reading and the complementary color reading in the reading step and the conversion step;
   a selection step of selecting a lowest one of signal levels from each of the brightness signal distributions generated in the generation step;
   a forming step of forming conversion tables, respectively corresponding to the primary color reading and the complementary color reading, which are used for converting the image data so as to make a pixel value higher than a pixel value corresponding to the lowest one of the signal levels selected in the selection step close to a pixel value representing white; and
   an image processing step of performing under color removal of the image data using one of the conversion tables in accordance with a result of whether the reading of the image original is the primary color reading or the complementary color reading.

2. The method according to claim 1, further comprising a storage step of storing the conversion tables formed in the forming step in a non-volatile memory.

3. The method according to claim 1, wherein the image data in the generation step is image data which has undergone shading correction, pre-gamma conversion, color correction, and filter processing and is input to post-gamma conversion processing.

4. The method according to claim 3, wherein one of the conversion tables is a one-dimensional lookup table.

5. The method according to claim 1, wherein the image data in the generation step is image data which has undergone shading correction and pre-gamma conversion and is input to color correction processing.

6. The method according to claim 5, wherein the one of the conversion tables is a three-dimensional lookup table.

7. An image reading apparatus which irradiates an image original with light, receives the reflected light, and reads the image original based on the received light, the apparatus comprising:
   a light emitting unit configured to emit light components of three primary colors;
   a light receiving unit configured to receive the light reflected by the image original irradiated with the light emitting unit;
   a generation unit configured to generate a brightness signal distribution of each color component from each of image data generated by primary color reading performed by causing the light emitting unit to sequentially irradiate a printing medium without any printed image with the light components of three primary colors and causing the light receiving unit to receive the light reflected by the printing medium and complementary color reading performed by causing the light emitting unit to simultaneously irradiate the printing medium with one of three different color combinations, which includes two of the light components of three primary colors, and causing the light receiving unit to receive the light reflected by the printing medium, and convert image data generated by the complimentary color reading into image data represented by a color space that is the same as that representing image data generated by the primary color reading;
   a selection unit configured to select a lowest one of signal levels from each of the brightness signal distributions generated by the generation unit;
   a forming unit configured to form conversion tables, respectively corresponding to the primary color reading and the complementary color reading, which are used for converting the image data so as to make a pixel value higher than a pixel value corresponding to the lowest one of the signal levels selected by the selection unit close to a pixel value representing white; and
   an image processing unit configured to perform under color removal of the image data using one of the conversion tables in accordance with a result of whether the reading of the image original is the primary color reading or the complementary color reading.

8. A multifunction printer comprising:
   an image reading apparatus according to claim 7; and
   print unit configured to print an image on a printing medium based on one of externally input image data and image data representing an image read by the image reading apparatus.

* * * * *